P. H. Walker,

Weighing Scale.

No. 97,839.   Patented Dec. 14, 1869.

Witnesses
Edward Griffiths
Geo. A. Loring

P. H. Walker
by his Attorney
Frederick Curtis

United States Patent Office.

P. H. WALKER, OF BOSTON, MASSACHUSETTS, ASSIGNOR TO HIMSELF AND JOHN L. TROWBRIDGE, OF SAME PLACE.

Letters Patent No. 97,839, dated December 14, 1869.

IMPROVEMENT IN STEELYARDS.

The Schedule referred to in these Letters Patent and making part of the same.

*To all to whom these presents shall come:*

Be it known that I, P. H. WALKER, of Boston, in the county of Suffolk, and Commonwealth of Massachusetts, have made an invention of certain new and useful Improvements in Weighing-Scales or Apparatus; and do hereby declare the following to be a full, clear, and exact description thereof, due reference being had to the accompanying drawings, making part of this specification, and in which—

Figure 1:
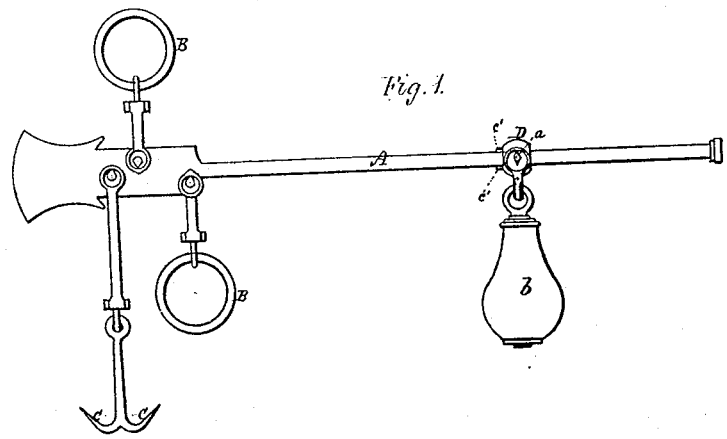

Figure 1 is a side representation, and

Figure 3:
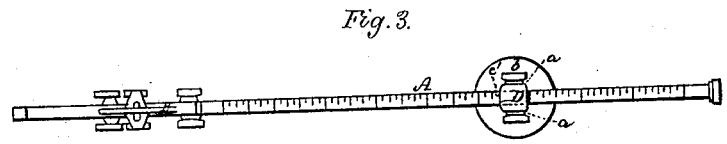
Figure 2:

Figure 2, an end elevation of a "steelyard," so called, containing my invention, Figure 3 being a plan of the same.

The invention to be herein described relates to certain novel and useful improvements in weighing-scales, whereby the wear upon the beam, and the defacing of its division marks, is very much lessened, and the adjusting of the weight upon the beam, to balance it, effected much more easily and expeditiously than by any mode, to my knowledge, heretofore adopted.

The invention under discussion consists in the employment of a sliding block or cross-head, encircling the beam of a weighing apparatus, and from which is suspended, in a suitable manner, the weight employed to balance such beam, the mode of suspension of the weight being such as to allow of the inversion of the scale-beam, when "steelyards" are used, without removing it from contact therewith, the change of position of the beam being frequently necessary, when the amount to be weighed by the scales varies to a great extent.

In the drawings, before premised as accompanying this specification, and which illustrate my invention—

A denotes the beam,

B B, the finger-hooks, upon opposite sides of such beam, and from which it is suspended; and C C, the hook, from which is hung the article to be weighed, such beam, suspensory, and hook, being constructed and arranged in the usual manner of "steelyards," so called.

In carrying out my invention, I produce a tubular block, D, of metal, formed in a proper manner to embrace and slide easily upon the beam A, this block being provided with suitable knife-edge bearings, *a a*, from which are suspended a pendent weight, *b*, this suspensory being, in the present instance, a single "gimbal," *c*, in manner as represented, the employment of this "gimbal" in this position enabling the weight to be passed about the end of the beam, when it becomes necessary to invert the latter to gain access to one or the other of its scale of divisions.

The inner edge of the cross-head or block D is provided with an index-pointer, *c'*, upon one or both sides of the beam, for convenience in adjusting the weight to the poising of the latter, and such block should embrace a sufficiently extended portion of the area of such beam as to reduce, to a very great extent, the wear or destruction of the same.

So, with regard to the "gimbal"-joint for effecting the union of the weight and cross-head; it will be evident that this may be accomplished in a variety of ways, as, for instance, a small portion of the outer extremity of the beam A may be reduced to such an extent as to allow the cross-head, when pushed thereon, to easily turn about it.

As before prefaced, the adoption of my present improvement lessens or retards wear upon the beam, and mutilation of its division-marks, attendant upon a weight applied directly to the beam, as heretofore.

In addition to this economy of wear, resulting from the employment of my invention, it will be found in practice that the adjusting of the weight upon the beam, in effecting its equipose, may be accomplished with much greater ease, and in comparatively much less time than is now required to slip the weight from one to the other of the notches of the scale of divisions.

I am aware that the scale for which a patent was granted W. A. Starratt on the 9th of July, 1867, has a sliding weight encircling the scale-beam.

This arrangement, however, not only renders the scales bulky and inconvenient for use, but is practically valueless, as it is difficult and indeed impracticable to mount a sliding weight of the size often required upon the scale-beam, without taking up much more room on the beam than ordinary scales will admit of.

My invention obviates all these defects by the mode of hanging the weight upon a tubular sliding cross-head, encircling and fitting said beam in such manner that, first, the cross-head alone is in contact with the beam, thus avoiding cumbering the beam with the weight itself; second, the position of the weight may be readily changed, when the beam is reversed, without removing the weight from the cross-head, or the cross-head from the beam; and, third, the same cross-head may be used with weights of ordinary construction.

Claim.

Having thus described the nature, uses, and advantages of my invention,

What I claim to be novel and original with myself, and desire to secure by Letters Patent of the United States, is as follows:

The employment, for the purpose of suspending the weight from a reversible scale-beam, of a tubular sliding cross-head, which encircles and fits the beam, and upon which the weight is hung, substantially in the manner and for operation as herein shown and described, so that when the beam is reversed the position of the weight may be correspondingly changed without removing the cross-head from the beam, or the weight from the cross-head.

P. H. WALKER.

Witnesses:
FRED CURTIS,
EDWARD GRIFFITH